No. 815,497. PATENTED MAR. 20, 1906.
H. P. WATSON.
NUT LOCK.
APPLICATION FILED APR. 29, 1905.

Witnesses
Howard D. Orr
B. G. Foster

Henry P. Watson, Inventor,
By C. G. Siggers
Attorney

UNITED STATES PATENT OFFICE.

HENRY P. WATSON, OF LOUISVILLE, KENTUCKY.

NUT-LOCK.

No. 815,497. Specification of Letters Patent. Patented March 20, 1906.

Application filed April 29, 1905. Serial No. 258,075.

*To all whom it may concern:*

Be it known that I, HENRY P. WATSON, a citizen of the United States, residing at Louisville, in the county of Jefferson and State of Kentucky, have invented a new and useful Nut-Lock, of which the following is a specification.

This invention relates to means for locking nuts and similar devices; and the object is to provide a structure of a novel nature whereby a nut can be securely locked against detachment upon a shank, but may be released, removed, and replaced, if desired, without injury to the nut, shank, or locking means, said structure, furthermore, being very simple and readily applicable to various types and forms of nuts, bolts, and the like.

The preferred embodiment of the invention is illustrated in the accompanying drawings, wherein—

Figure 1:
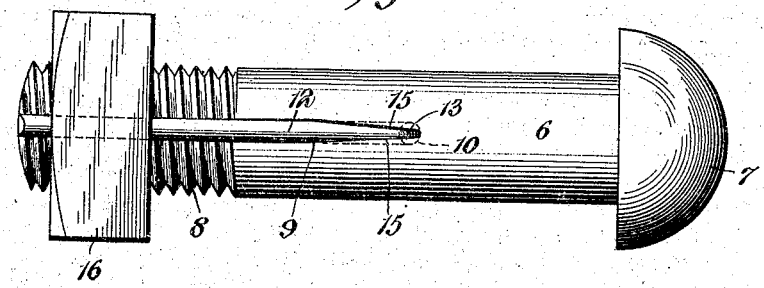
Figure 2:
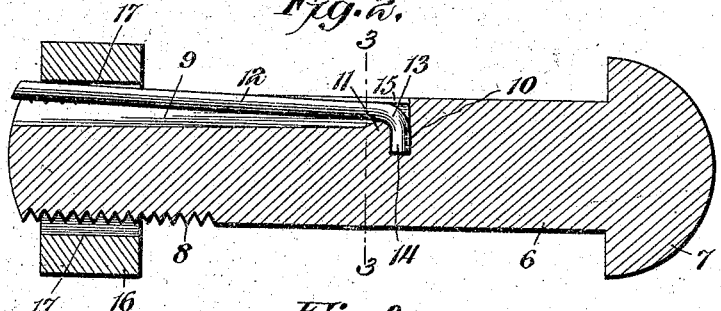
Figure 3:
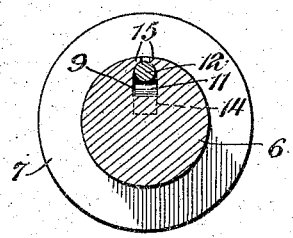
Figure 4:
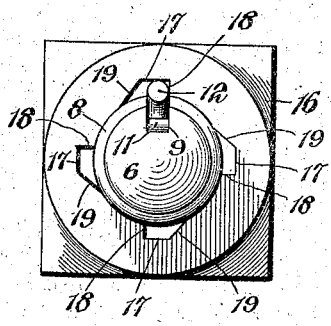
Figure 5:
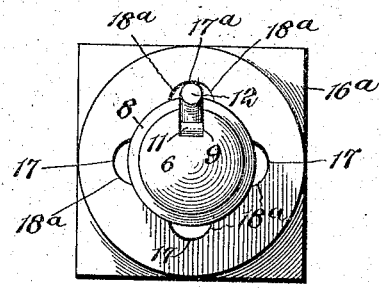

Figure 1 is a view in elevation of a bolt provided with the improved locking means. Fig. 2 is a longitudinal sectional view therethrough. Fig. 3 is a cross-sectional view on the line 3 3 of Fig. 2. Fig. 4 is an end elevation of the structure. Fig. 5 is an end elevation of a slightly-modified form of construction.

Similar reference-numerals designate corresponding parts in all the figures of the drawings.

In the particular form shown a bolt is employed comprising a shank 6, having a head 7 at one end and having its other end threaded, as shown at 8. The shank is provided in one side with a longitudinally-disposed slot 9, extending transversely of the threads to the end of said shank and having its outer end deeper than its inner end, said slot having its bottom inclining toward said outer end. At the inner end of the slot is formed a right-angularly-disposed socket 10, deeper than the slot, but separated therefrom by a lug 11. This lug is located directly at one side of the socket, terminating short of the outer face of the shank and having a rounded outer face, as shown. A locking device in the form of a spring wire or dog 12 extends longitudinally in the slot 9, being normally spaced from the bottom thereof and projecting beyond the face of the shank. The inner terminal portion of the dog is bent around and over the lug 11, as shown at 13, and the end 14 is seated snugly in the socket 10. In order to hold said end 14 in place and the portion 13 upon the lug 11, the material of the shank on opposite sides of the slot is swaged over said portion 13 to form a pair of retaining-lips 15, said lips thus constituting means for holding the dog in place.

A nut 16 of any suitable shape is arranged to be screwed upon the threaded portion of the shank and is provided in its inner sides with a series of recesses 17, adapted to receive the outer portion of the locking-dog. In the preferred structure these recesses are provided with substantially radial walls 18, constituting stops that abut against the dog, their opposite walls being inclined, as shown at 19. Instead of this structure a nut $16^a$ may be employed having recesses $17^a$, the walls of which are curved, as shown at $18^a$.

The bolt illustrated is employed in the ordinary manner—that is to say, the shank is passed through the articles to be held and the nut screwed upon the threaded end thereof. As said nut revolves the dog will be forced into the slot 9 of the shank and will spring outwardly into the recesses 17. Because of the inclined faces 19 as long as the nut is being screwed upon the shank it can rotate freely, said inclined faces forcing the dog into the slot. A retrograde movement is, however, prohibited by the shoulders 18, which will strike the side of the dog and be prevented from movement past the same. It will be observed by reference to Fig. 4 that practically two-thirds of the outer portion of the dog projects beyond the shank, the remaining one-third being located in the slot thereof, said dog thus interlocking with both elements. To remove the bolt, it is only necessary to force the dog by suitable means into its slot, whereupon the nut is released and can be readily unscrewed. In Fig. 5 the rounded walls of the recesses $17^a$ serve to permit the turning of the nut in either direction when abnormal strain is applied thereto—as, for instance, under the action of a wrench; but the dog will be found to interlock sufficiently with said nut to prevent its turning under ordinary conditions.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

In a device of the class described, a threaded shank having a longitudinal slot in one side for the reception of a dog, a socket deeper than the slot and located at the inner end thereof, and a bearing-lug located in the slot and separating the socket and slot, said lug being located directly at one side of the socket, terminating short of the outer face of the shank, and having a rounded outer bearing-face, in combination with a spring locking-dog located longitudinally in the slot and having its inner end bent around the lug, which constitutes a fulcrum for the dog, said end bearing against the lug and being seated in the socket for holding the dog against longitudinal movement in the slot, said dog furthermore having its outer side projecting beyond the shank, and means extending over the inner end of the dog and likewise over the bearing-lug and the portion of the dog engaged therewith to hold said dog in the seat and in engagement with the lug, and a nut threaded on the shank and having recesses in its inner side, said dog being yieldingly projected into the recesses and thereby holding the nut against turning in one direction on the shank.

In testimony that I claim the foregoing as my own I have hereto affixed my signature in the presence of two witnesses.

HENRY P. WATSON.

Witnesses:
   J. D. BARNHILL,
   WM. P. BYHEE.